Patented Aug. 26, 1947

2,426,316

UNITED STATES PATENT OFFICE 2,426,316

VINYL RESIN COMPOSITIONS CONTAINING FACTICE

Frank S. Martin, Providence, R. I., assignor to United States Rubber Company, New York, N. Y., a corporation of New Jersey No Drawing. Application September 25, 1943, Serial No. 503,854

4 Claims. (Cl. 260—23)

This invention relates to improvements in vinyl resin compositions, and more particularly those relating to a certain class of vinyl ester resins.

An object of the invention is to provide vinyl resin compositions which will show improved processing characteristics and better physical properties at a reduced cost. This object is accomplished by the addition of a factice to polyvinyl chloride-acetate copolymer resins. Other objects will be apparent from the following description.

Compositions prepared according to the present invention show improved resistance to steam sterilization. The composition may be calendered onto the fabric with good results at lower temperatures than are normally used for calendering similar compositions that do not contain the factice. The addition of the factice raises the temperature at which the compositions become tacky. This is an advantage for applications where the coated fabric must be folded without sticking at relatively high temperature. Also, the addition of factice reduces the cost of the compound. For this reason, the cost per unit volume is considerably lower than that of the compounds normally used. The cost can, of course, be reduced by using larger amounts of cheap fillers such as clay or whiting; however, the addition of these materials raises the gravity of the compound and stiffens the compound to an undesirable degree.

The vinyl resins can be plasticized and compounded with pigments to give compositions suitable for molding, coating, and other common applications for thermosetting and thermoplastic resins. The coating compositions may be applied by calendering methods or from suitable solution.

There are various benefits in using the factice. Among others, examples of vinyl acetate-vinyl chloride copolymers which may be used in coating compositions, are the copolymer resins designated as having a content of 88.5–90.5 percent vinyl chloride (Staudinger average molecular weight 16,000), and a content of 93–95 percent vinyl chloride (Staudinger average molecular weight 24,000). These resins for the sake of brevity are hereinafter designated VYNS and VYNW, respectively. They differ in molecular weight, and in the percentage of vinyl chloride used in making the copolymer. The VYNW may be plasticized and pigmented to give a coating composition which is resistant to steam sterilization. However, the resulting composition has a very high softening point and must be applied either from solution, or, if calendered, at extremely high calender temperatures. Even when applied at high temperatures and especially when calendered at lower temperatures, the VYNW coating has a strong tendency to shrink and crack when subjected to steam sterilization. This shrinkage and cracking is overcome to a marked degree by the addition of factice to the coating composition. The addition of factice further permits use of lower calender temperatures to obtain a satisfactory coating. VYNS is a lower molecular weight polymer and contains less vinyl chloride. It may be applied at somewhat lower temperatures than are necessary for the VYNW but the resultant coatings are not resistant to steam sterilization and soften at only moderately high temperatures. The addition of factice improves the VYNS composition in these respects; the compositions containing factice will stick together less when folded during steam sterilization tests than the compositions that do not contain factice. The factice contributes enough resistance to heat so that coated fabric may be heated to 180° F. without becoming so soft and tacky that it will stick together when folded and pressed together with a pressure of 1 lb. per square inch.

The effect of the factice is enhanced by baking the coated fabric for 30 minutes to 1 hour at from 240° F. to 280° F. The temperature and time of baking may be varied as desired.

The table shows the results obtained by adding factice to VYNS and VYNW compositions; the parts are by weight:

Table

|  | 1 | 2 | 3 | 4 | 5 | 6 |
|---|---|---|---|---|---|---|
| VYNW |  |  |  | 100.0 | 100.0 | 100.0 |
| VYNS | 100.0 | 100.0 | 100.0 |  |  |  |
| Dioctyl Phthalate | 70.0 | 70.0 | 70.0 | 110.0 | 110.0 | 110.0 |
| Calcium Stearate | 2.5 | 2.5 | 2.5 | 2.5 | 2.5 | 2.5 |
| White Substitute |  | 25.0 |  |  | 25.0 |  |
| Brown Substitute |  |  | 25.0 |  |  | 25.0 |
| Whiting | 45.0 | 45.0 | 45.0 | 45.0 | 45.0 | 45.0 |

STERILIZATION TESTS

|  | 1 | 2 | 3 | 4 | 5 | 6 |
|---|---|---|---|---|---|---|
| Unbaked | Wrinkled and Blistered. | Satisfactory, Very Slight Wrinkling. | Very Slight Wrinkling and Blistering. | Film Badly Cracked. | Satisfactory. | Satisfactory. |
| Baked 60 Minutes at 255° F. | do | Satisfactory | Satisfactory | Slight Cracking of Film. | do | Do. |

The dioctyl phthalate serves as a plasticizer. Calcium stearate is added as a heat stabilizing agent. Whiting serves as an inorganic filler. The white substitute (white factice) is a product prepared by treating vegetable oil with sulfur chloride. The brown substitute (brown factice) is typical of the medium soft brown factice prepared by treating vegetable oils with sulfur. These products are representative of the general class of sulfur treated vegetable oils sold to the rubber trade as rubber substitute. The brown substitutes in particular are made in several grades ranging from very soft materials to materials which are quite hard. The very soft factices reduce the drying up of the surface of the coated fabrics and the very hard types would give a stiff product. For this reason, the intermediate grades are preferable. However, the exact grade used will depend upon the properties desired for the coated fabrics.

The steam sterilization test consists of subjecting a folded sample of coated fabric to 15 lbs. steam pressure at 121° C. for 30 minutes. The sample is removed from the sterilizer and washed with soap, water and a soft brush to remove surface finishing materials. It is then subjected to four additional sterilizations of 20 minutes each at 110° C. The sample is exposed to air at least 20 minutes between each sterilization and allowed to stand in air at least 2 hours after the last sterilization before examination.

The proportion of materials used in the above examples may be varied considerably without greatly altering the results obtained. The proportion of factice used will depend on the application and upon the type of factice used. Normally 15 to 30 percent by weight of the factice, based on the vinyl resin, will give the desired results. In some cases, less is desirable. Compositions have been made containing as much as 50 parts of factice. However, these have such a low tensile strength that they are not suitable for most applications.

The compositions may be prepared by mixing all the dry ingredients together with the plasticizer and resins, and then thoroughly milling the mixture on a hot rubber mill until homogeneous, afterwards allowing the mix to cool, and remilling and warming for calendering, etc. Or, the factice may be dispersed alone or with a portion of the pigment and fillers in the plasticizer (by ball milling) before adding these ingredients to the vinyl compound.

The compounds disclosed in the invention may be used for coating fabrics for hospital sheeting, bags, aprons, protective clothing, gloves, and other similar articles for which fabrics coated with rubber, pyroxylin or the like has been used in the past. Compounds may also be used for molded and extruded articles. By dissolving the compounds in suitable solvents, cements for adhesives or for coating purposes may be prepared, either with or without the aforesaid mill mixing.

Having thus described my invention, what I claim and desire to protect by Letters Patent is:

1. An improved vinyl acetate-vinyl chloride copolymer resin composition comprising, in addition to a plasticizer for the vinyl resin, a factice in a proportion by weight of up to 30 percent, based on the vinyl resin content and effective to increase resistance to shrinkage and cracking when the composition is subjected to steam sterilization, the said copolymer resin having from 88.5 to 95 percent vinyl chloride content.

2. An improved vinyl acetate-vinyl chloride copolymer resin composition comprising, in addition to a plasticizer for the vinyl resin, a white factice in a proportion by weight of up to 30 percent, based on the vinyl resin content and effective to increase resistance to shrinkage and cracking when the composition is subjected to steam sterilization, the said copolymer resin having from 88.5 to 95 percent vinyl chloride content.

3. An improved vinyl acetate-vinyl chloride copolymer resin composition comprising, in addition to a plasticizer for the vinyl resin, a brown factice in a proportion by weight of up to 30 percent, based on the vinyl resin content and effective to increase resistance to shrinkage and cracking when the composition is subjected to steam sterilization, the said copolymer resin having from 88.5 to 95 percent vinyl chloride content.

4. A fabric coated with an improved resin composition as set forth in claim 1.

FRANK S. MARTIN.

REFERENCES CITED

The following references are of record in the file of this patent:

UNITED STATES PATENTS

| Number | Name | Date |
|---|---|---|
| 2,275,376 | Ellis | Mar. 3, 1942 |
| 2,111,006 | Robie | Mar. 15, 1938 |

OTHER REFERENCES

Page 199, Summary of Current Literature, Abstracts-Research Assn. of Br. Rubber Mfrs., vol. 22, No. 6, June 1944.

"Vinylite Resins—Their Forms, Properties, and Uses," p. 7 pub. 1942 by Carbide and Carbon Chem. Corp., N. Y.